Nov. 11, 1930.                C. A. COOK                1,781,569
                LINE SUPPORTING RING FOR FISHING RODS
                Filed Feb. 19, 1930          2 Sheets-Sheet 1
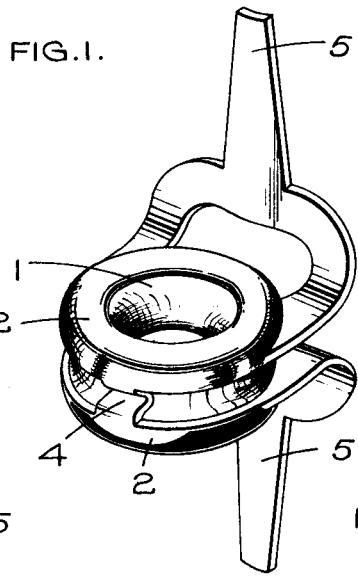
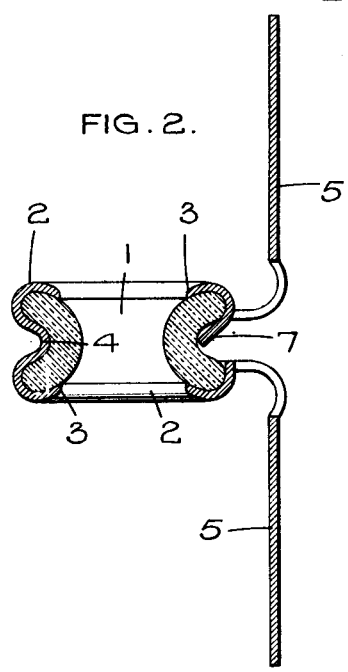
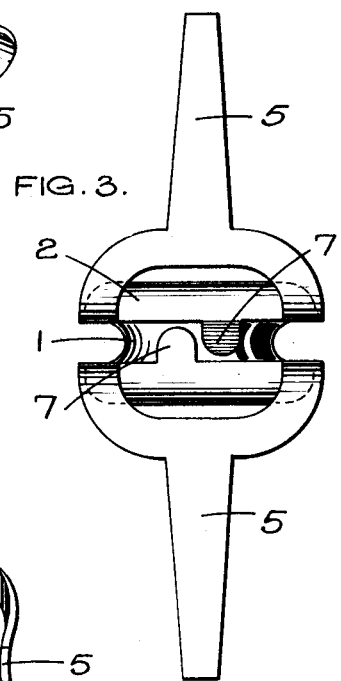
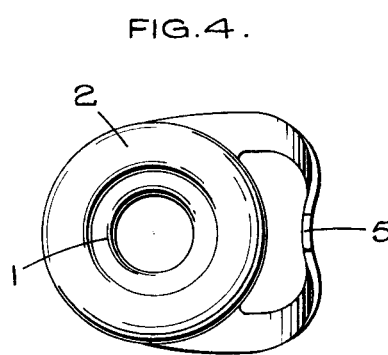
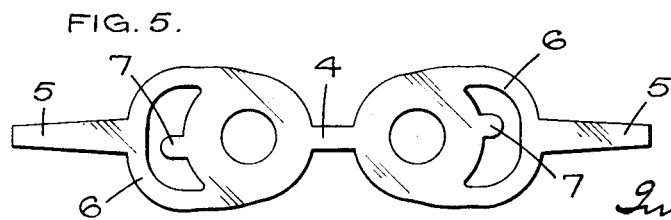
Inventor:
Charles A. Cook
by Richard E. Babcock
Attorney Nov. 11, 1930.  C. A. COOK  1,781,569
LINE SUPPORTING RING FOR FISHING RODS
Filed Feb. 19, 1930  2 Sheets-Sheet 2

Inventor:
Charles A. Cook
by Richard E. Babcock
Attorney

Patented Nov. 11, 1930

1,781,569

UNITED STATES PATENT OFFICE

CHARLES ARTHUR COOK, OF REDDITCH, ENGLAND, ASSIGNOR TO HENRY WILKES & COMPANY, LIMITED

LINE-SUPPORTING RING FOR FISHING RODS

Application filed February 19, 1930, Serial No. 429,651, and in Great Britain March 5, 1929.

This invention relates to line-supporting means for fishing rods and to the means of manufacturing same, more particularly to the class of ring which is usually constructed from porcelain, agate or other brittle material and is provided with a suitable metal support for its attachment to the rod.

Such rings as at present manufactured are usually provided with a peripheral groove for the reception of the metal-supporting member, the supporting member being usually constructed from a length of wire bent into the form of a loop so as to surround the porcelain ring and lie within the peripheral groove, the ends of the wire loop being bent to provide feet adapted to lie along the rod, the feet being usually secured to the rod by means of twine.

It is found that such rings when in use are liable to become chipped or broken, particularly at their edges, due mainly to the fact that their flanges project beyond the metal-supporting member, and the primary object of the present invention is to provide a construction of ring and its associated support which will be stronger than those constructed hitherto, and which will not be liable to become broken when in use.

A further object of the invention is to enable the device to be more cheaply produced than hitherto by eliminating the necessity for soldered or brazed joints.

In accordance with the present invention I provide a line-supporting ring for fishing rods of the class referred to, including a protecting member or shield formed from sheet metal and in the form of two ring-like parts adapted to lie one upon each side of the porcelain ring and to enclose or partially enclose the flanges thereof, the protecting member having one or more legs or feet for its attachment to the rod.

A further feature of the present invention is to construct both ring-like members forming the shield or protecting member from a single piece of sheet metal, the ring-like parts being connected together by means of a relatively narrow neck portion.

Referring to the drawings:—

Figure 1 is a perspective view of one form of line-supporting ring constructed in accordance with my invention.

Figure 2 is a section thereof.

Figure 3 is an inverted plan view.

Figure 4 is an end elevation.

Figure 5 is a view illustrating the blank from which the shield or protecting member is constructed.

Figure 6:
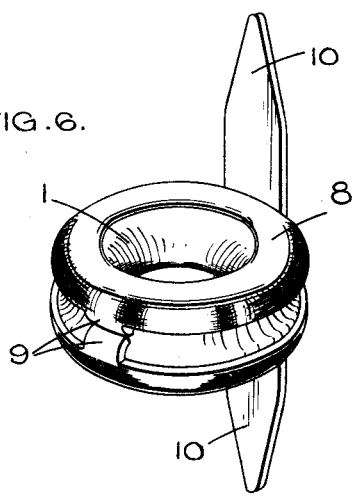
Figure 6 is a perspective view of a modified construction of line-supporting ring.

In the construction illustrated by Figures 1 to 5 of the accompanying drawings, the line-supporting ring proper 1 which is constructed from porcelain, agate, or other brittle material, is provided with a protecting member or shield in the form of two ring-like members 2 formed from sheet metal, the outer periphery of each ring-like member being bent so as to enclose or partially enclose the flange of the porcelain ring, the inner periphery of each ring-like part being bent so as to enter the opening formed in the ring 1, the inner periphery being preferably chamfered as at 3 to prevent it fraying the line which passes through the single opening in the porcelain ring.

Both of the ring-like parts 2 are formed from a single piece of sheet metal, the ring-like parts being connected together at their edges by means of a relatively narrow integral neck-like part 4.

The blank from which the ring-like parts are to be formed is shown clearly in Figure 5, and each ring preferably includes an integrally formed attachment foot 5 for connecting the shield or protecting member to the fishing rod, each foot 5 being connected to the periphery of the adjacent ring-like part by means of a forked portion 6 which serves to space the foot at the correct distance from the periphery of the shield or protecting member.

The ring-like parts 2 which are adapted to be mounted one on each side of the porcelain ring 1, are adapted to be held in position by means of the neck-like part 4 which is adapted to be pressed into the peripheral groove formed in the porcelain ring and by means of lugs or ears 7 which are constructed integrally with the ring-like parts 2, these lugs 7 being adapted to be pressed into the peripheral groove in the porcelain ring, and are preferably arranged in staggered relation with each other as shown clearly in Figure 5, this arrangement enabling the lugs or ears to be of a greater length than if they were arranged exactly opposite to each other.

The forked parts 6, when the protecting member or shield is mounted in position on the porcelain ring, lie substantially parallel with each other throughout the greater part of their length, their extremities being bent apart in such a manner that the feet 5 are arranged in diverging relationship, the line-supporting ring being secured to the periphery of the rod by means of twine or any other suitable securing means.

If desired, the feet 5 may be curved slightly in cross section so as to conform more exactly to the shape of the rod.

Figure 7:
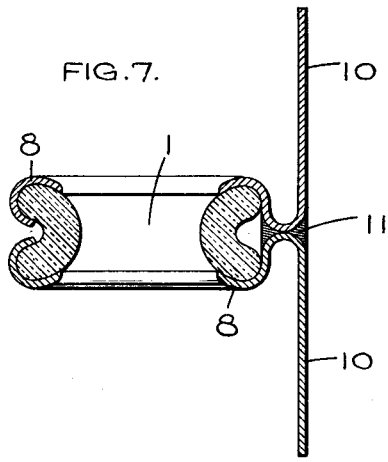
Figure 7 is a section thereof.

In the modified arrangement illustrated by Figures 6 and 7, the ring-like protecting members 8 are each constructed from a single piece of sheet metal, the periphery of each ring-like part being provided with one or more lugs or ears 9 which are adapted to be bent into the peripheral groove in the porcelain ring 1 and thereby retain the ring-like protecting members firmly in position.

Each ring-like member 8 is provided with an integrally constructed foot member 10 for its attachment to the rod, these feet 10 being, if desired, bent together intermediate their length as shown clearly in Figure 7, and secured together by solder or the like 11.

Figure 8:
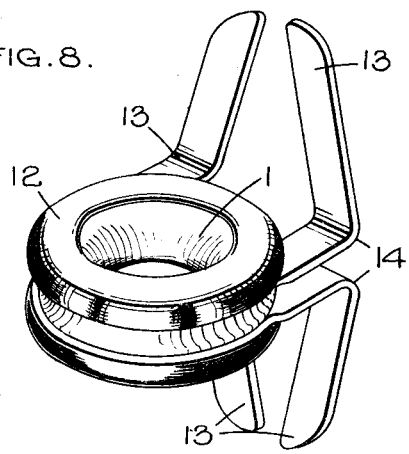
Figure 8 is a perspective view of a further modified construction.
Figure 9:
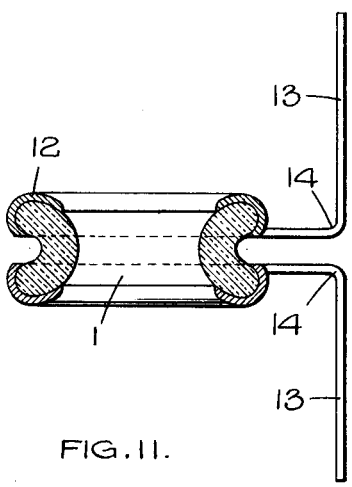
Figure 9 is a section thereof.

In the further construction illustrated by Figures 8 and 9, the ring-like members 12 are again each formed from a single piece of sheet metal and are secured in position upon the porcelain ring 1 by bending or flanging over their peripheries so that they enter into the peripheral groove formed in the porcelain ring, the flanges extending into the peripheral groove, if desired, to a greater extent than in the case of the constructions hitherto described, the flanging of their peripheries into engagement with the porcelain ring forming the only source of connection between the porcelain ring and the protecting member or shield.

Each ring-like part 12 is provided with a pair of integral feet 13, these feet projecting from the periphery of the ring and being bent at 14 intermediate their length so that the extremities of each pair converge towards each other.

Figure 10:
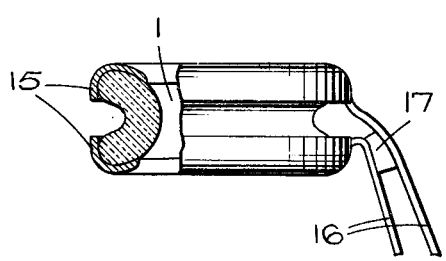
Figure 10 is a fragmentary section illustrating a still further modified construction.
Figure 11:
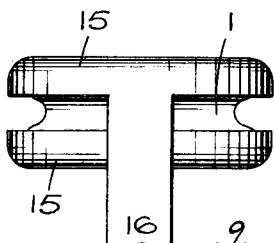
Figure 11 is a side elevation thereof.

In the construction shown in Figures 10 and 11 which shows a line-supporting ring intended for application to the extremity of a fishing rod, the porcelain ring 1 is again provided with a shield or protecting member in the form of two sheet metal ring-like parts 15 disposed one of each side of the porcelain ring, the outer and inner peripheries of each ring being bent so as to surround or partially surround the flanges of the porcelain ring, each ring-like part being provided with an integral foot portion 16 for its attachment to the fishing rod.

The feet 16 are adapted to lie one upon each side of the extremity of the rod and may be secured thereto by means of twine or any other suitable securing means, whilst, further, each ring-like part may, if desired, be provided at its outer periphery with one or more lugs or ears which can be bent into the peripheral groove provided in the porcelain member.

Alternatively, the outer periphery of each ring-like part may, as in the construction shown in Figures 8 and 9, be bent or rolled into a peripheral groove so as to more firmly connect the protecting member or shield to the porcelain ring.

The feet 16 may, if desired, be connected together at their inner ends by means of a blob of solder 17, or the like.

In any of the constructions illustrated, the attachment feet may be either of parallel or tapering sided formation, whilst they may be shaped or bent in any suitable manner to more intimately engage the periphery of the fishing rod with which the line-supporting ring is proposed to be used.

Although the inner periphery of each ring-like part is preferably chamfered at 3, the ring-like parts preferably extend only a short distance towards or into the opening of the porcelain ring in order to avoid any possibility of the line coming into contact with the metal parts when in use and thus becoming frayed or broken.

The porcelain or agate rings may be additionally secured within their surrounding protecting members or shields by means of cement or any other suitable adhesive.

The method and means employed for attaching the protecting members or shields to the porcelain ring may include the use of a die of part cylindrical form, the die preferably consisting of rather more than half a cylinder.

At its ends the die is provided with an inwardly directed flange, the under surface of which is inclined, say, at about 45°.

In operation, the sheet metal blank which has already had its edge raised to a cylindrical form, and which is going to form the protecting member, is placed on the end of the ring and the ring is then placed in the end of the die. The die may be operated by a press taking a short limited stroke, and the sheet metal shield member is supported during the pressing operation by a suitable flat surface. The pressing operation causes the rim of the shield member to buckle outwardly while the edge of the rim is distorted inwardly into the groove of the ring without damaging the ring.

Instead of providing the shields with projecting ears or lugs adapted to be bent into the groove of the ring, the ears or lugs may be omitted and the metal shields may be attached to the porcelain by means of a suitable waterproof cement such as that known as 'white shellac'.

The shields or protecting members may be formed from any suitable sheet metal and, if desired, may be constructed from a metal which is not liable to corrode or rust.

What I claim then is:—

1. Line-supporting means for fishing rods, comprising a ring of hard non-metallic material, a sheet metal shield for protecting the edges of the ring, and comprising two ring-like parts lying one upon each side of the non-metallic ring and embracing the edges thereof, and an attachment portion on the protecting member for its attachment to the rod.

2. Line-supporting means for fishing rods, comprising a ring of hard non-metallic material, a sheet metal protecting shield for protecting the edges of the non-metallic ring, and comprising two ring-like parts lying one upon each side of the non-metallic ring and embracing the edges thereof, the two ring-like parts being both formed from a single piece of sheet metal and including a relatively narrow integral neck-like connecting portion, and one or more feet for the attachment of the protecting member to the rod formed integral with the ring-like parts.

3. Line-supporting means for fishing rods, comprising a ring of hard non-metallic material, a sheet metal shield for protecting the edges of the non-metallic ring, and comprising two ring-like parts lying one upon each side of the non-metallic ring and embracing the edges thereof, the two ring-like parts being both formed from a single piece of sheet metal and including a relatively narrow integral neck-like connecting portion, the neck-like portion being bent so that it enters a peripheral groove in the non-metallic ring, and feet for the attachment of the protecting member to the rod formed integral with the ring-like parts.

4. Line-supporting means for fishing rods, comprising a hard non-metallic ring, a sheet metal shield for protecting the edges of the non-metallic ring, and comprising two ring-like parts lying one upon each side of the non-metallic ring and embracing the edges thereof, the two ring-like parts being both formed from a single piece of sheet metal and including a relatively narrow integral neck-like connecting portion, the neck-like portion being bent so that it enters a peripheral groove in the non-metallic ring, and lugs formed integral with the ring-like parts and bent into a peripheral groove in the non-metallic ring for retaining the ring-like parts in position upon the non-metallic member, and feet for the attachment of the shield to the rod formed integral with the ring-like parts.

5. Line-supporting means for fishing rods, comprising a hard non-metallic ring, a sheet metal shield for protecting the edges or flanges of the non-metallic ring, and comprising two ring-like parts lying one upon each side of the non-metallic ring and embracing the edges thereof, the two ring-like parts being both formed from a single piece of sheet metal and including a relatively narrow integral neck-like connecting portion, the neck-like portion being bent so that it enters a peripheral groove in the nonmetallic ring, and lugs formed integral with the ring-like parts and bent into a peripheral groove in the non-metallic ring for retaining the ring-like parts in position upon the non-metallic member, the lugs being arranged in staggered relationship, and feet for the attachment of the protecting member to the rod formed integral with the ring-like parts.

In witness whereof I affix my signature.

CHARLES ARTHUR COOK.